No. 618,234. Patented Jan. 24, 1899.
P. D. PANOULIAS.
MACHINE FOR DIPPING CHOCOLATE DROPS.
(Application filed Apr. 4, 1898.)
(No Model.) 7 Sheets—Sheet 1.

WITNESSES:

INVENTOR
Panayiotis D. Panoulias
BY
Edgar Tate & Co.
ATTORNEYS

No. 618,234. Patented Jan. 24, 1899.
P. D. PANOULIAS.
MACHINE FOR DIPPING CHOCOLATE DROPS.
(Application filed Apr. 4, 1898.)
(No Model.) 7 Sheets—Sheet 2.

WITNESSES:

INVENTOR
Panayiotis D. Panoulias
BY
Edgar Tate & Co.
ATTORNEYS

THE NORRIS PETERS CO., PHOTO-LITHO., WASHINGTON, D. C.

No. 618,234. Patented Jan. 24, 1899.
P. D. PANOULIAS.
MACHINE FOR DIPPING CHOCOLATE DROPS.
(Application filed Apr. 4, 1898.)

(No Model.) 7 Sheets—Sheet 4.

WITNESS
INVENTOR
Panayiotis D. Panoulias
BY
Edgar Tate & Co.
ATTORNEYS

No. 618,234. Patented Jan. 24, 1899.
P. D. PANOULIAS.
MACHINE FOR DIPPING CHOCOLATE DROPS.
(Application filed Apr. 4, 1898.)

(No Model.) 7 Sheets—Sheet 5.

WITNESS
INVENTOR
Panayiotis D. Panoulias
BY
Edgar Tate & Co.
ATTORNEYS

No. 618,234. Patented Jan. 24, 1899.
P. D. PANOULIAS.
MACHINE FOR DIPPING CHOCOLATE DROPS.
(Application filed Apr. 4, 1898.)
(No Model.) 7 Sheets—Sheet 6.

WITNESSES:

INVENTOR
Panayotis D. Panoulias
BY
Edgar Tate & Co.
ATTORNEYS

No. 618,234. Patented Jan. 24, 1899.
P. D. PANOULIAS.
MACHINE FOR DIPPING CHOCOLATE DROPS.
(Application filed Apr. 4, 1898.)
(No Model.) 7 Sheets—Sheet 7.
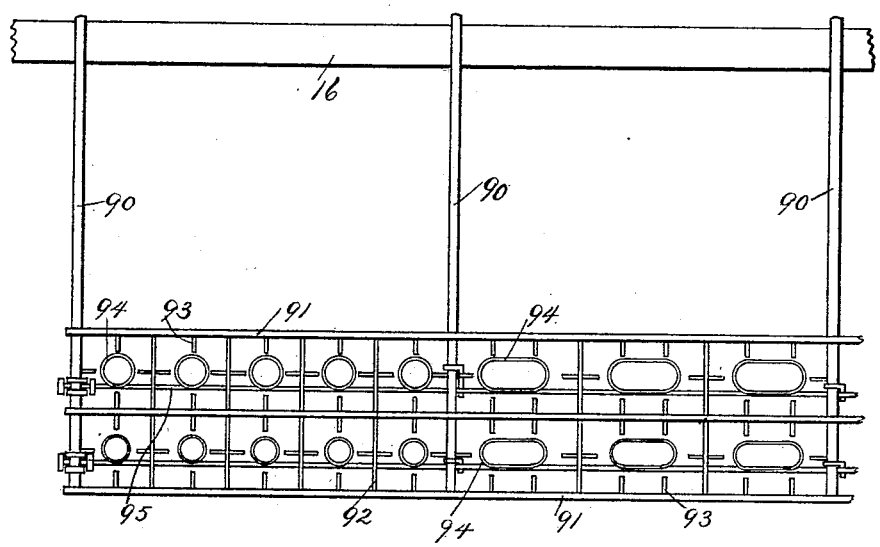
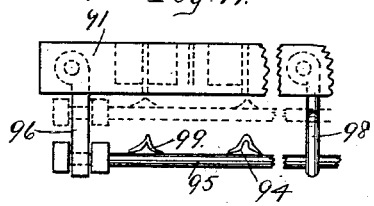
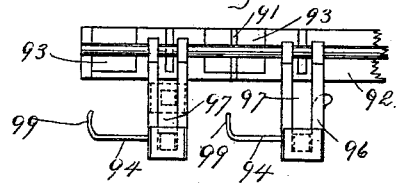
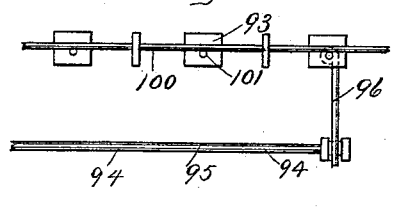
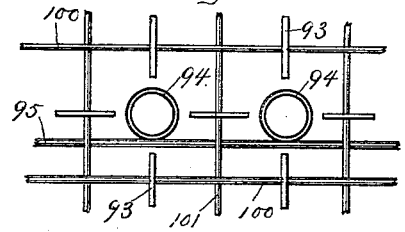
WITNESSES
INVENTOR
Panayiotis D. Panoulias
BY
Edgar Tate & Co
ATTORNEYS

UNITED STATES PATENT OFFICE.

PANAYIOTIS D. PANOULIAS, OF NEW YORK, N. Y.

MACHINE FOR DIPPING CHOCOLATE DROPS.

SPECIFICATION forming part of Letters Patent No. 618,234, dated January 24, 1899.

Application filed April 4, 1898. Serial No. 676,442. (No model.)

*To all whom it may concern:*

Be it known that I, PANAYIOTIS D. PANOULIAS, a subject of the King of Greece, residing at New York, in the county of New York and State of New York, have invented certain new and useful Improvements in Machines for Dipping Chocolate Drops, of which the following is a full and complete specification, such as will enable those skilled in the art to which it appertains to make and use the same.

This invention relates to machines for dipping chocolate drops; and it has for its object to provide a simple and improved machine of this class which will possess advantages in point of convenience, positive action, and efficiency.

The invention is fully disclosed in the following specification, of which the accompanying drawings form a part, in which the separate parts of my improvement are designated by the same numerals of reference in each of the views, and in which—

Figure 1:
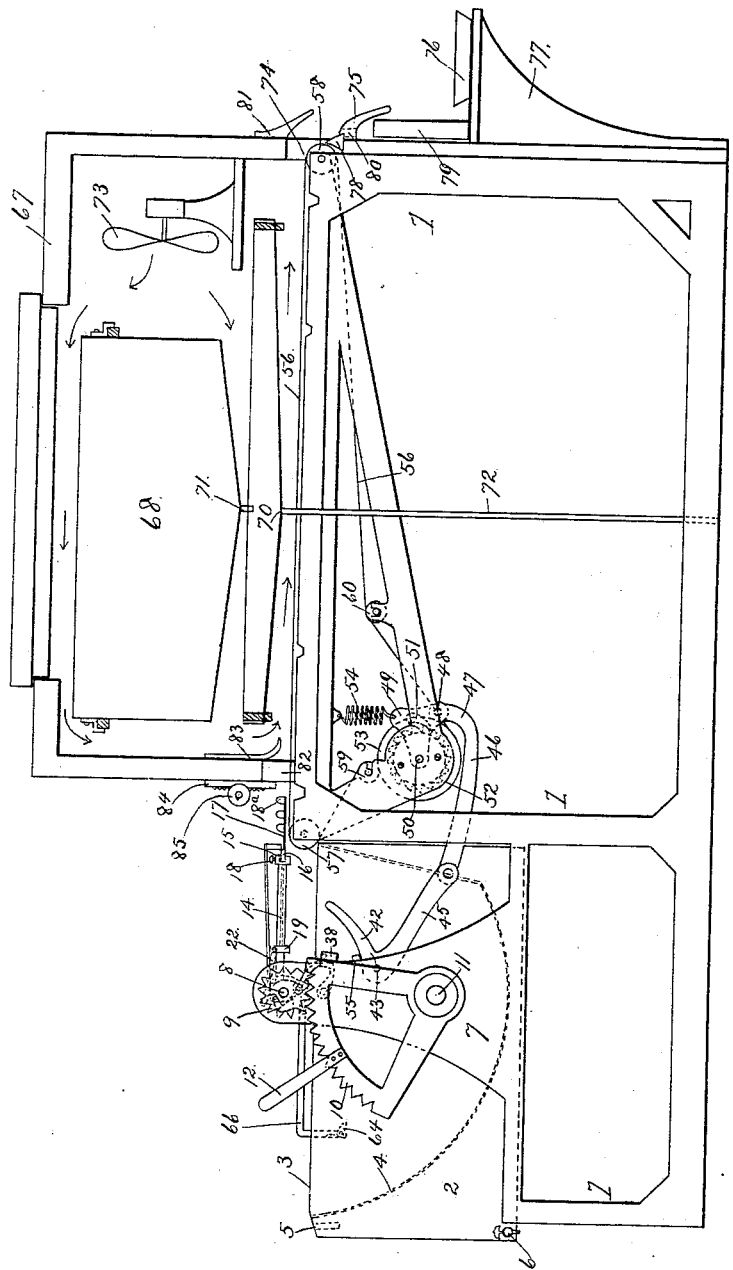
Figure 2:
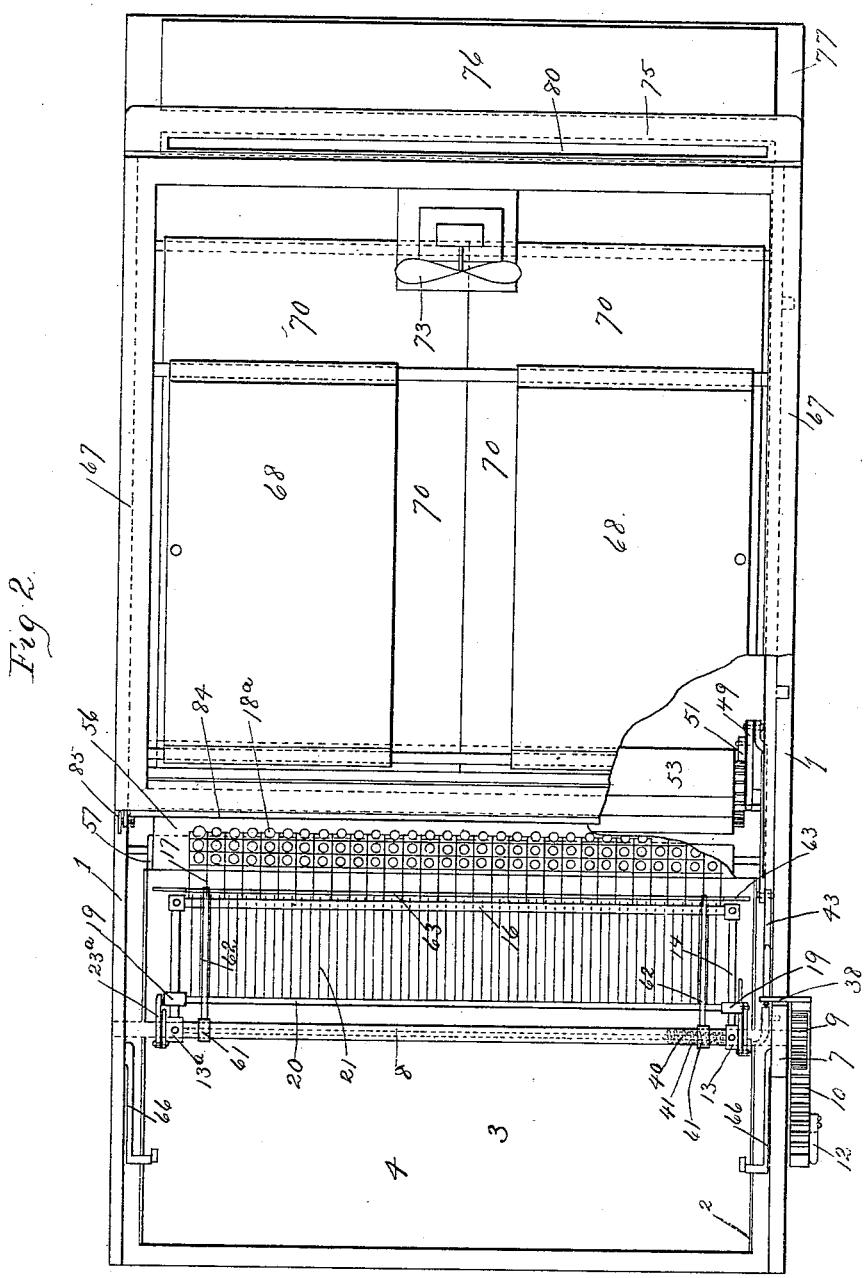
Figure 3:
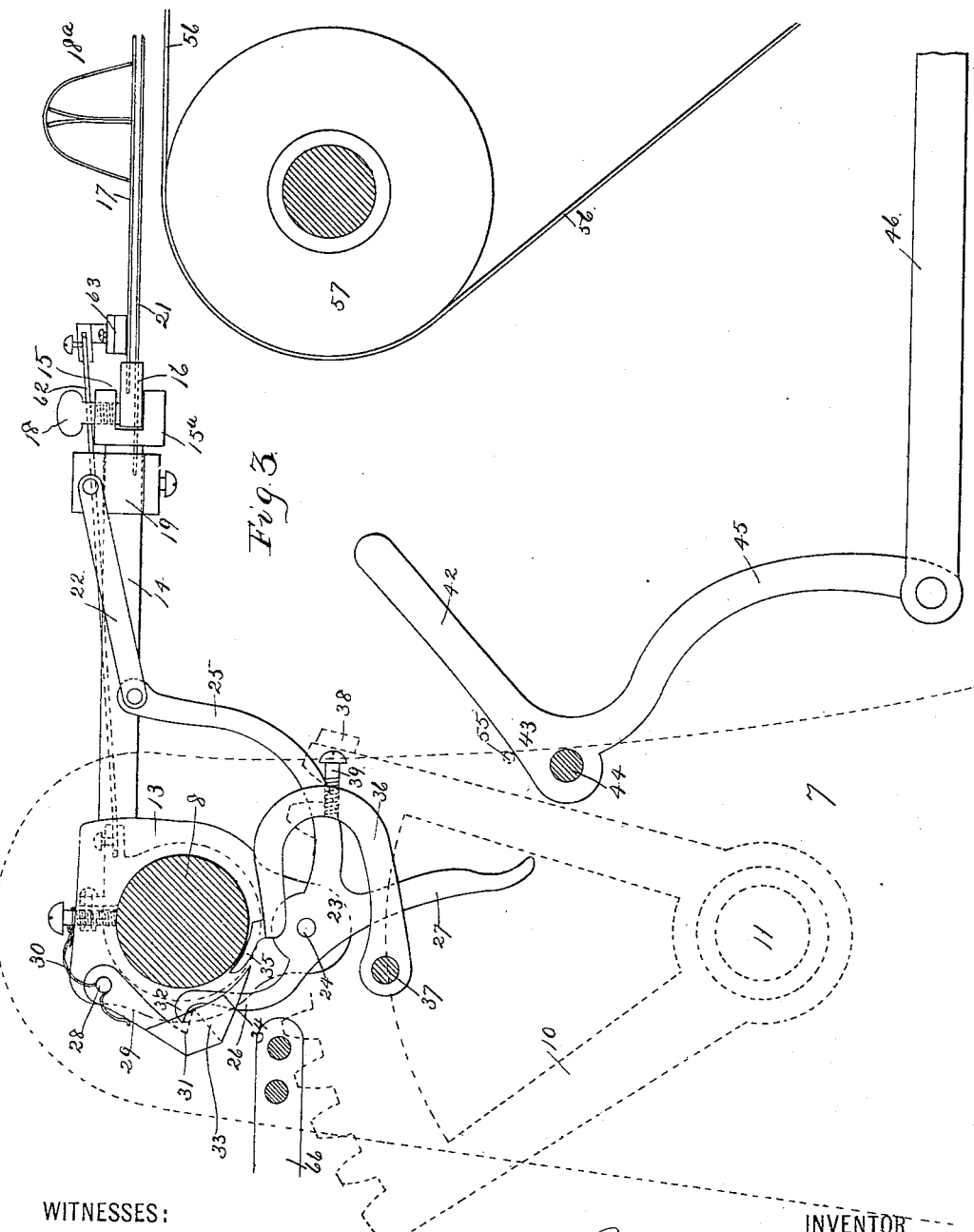
Figure 4:
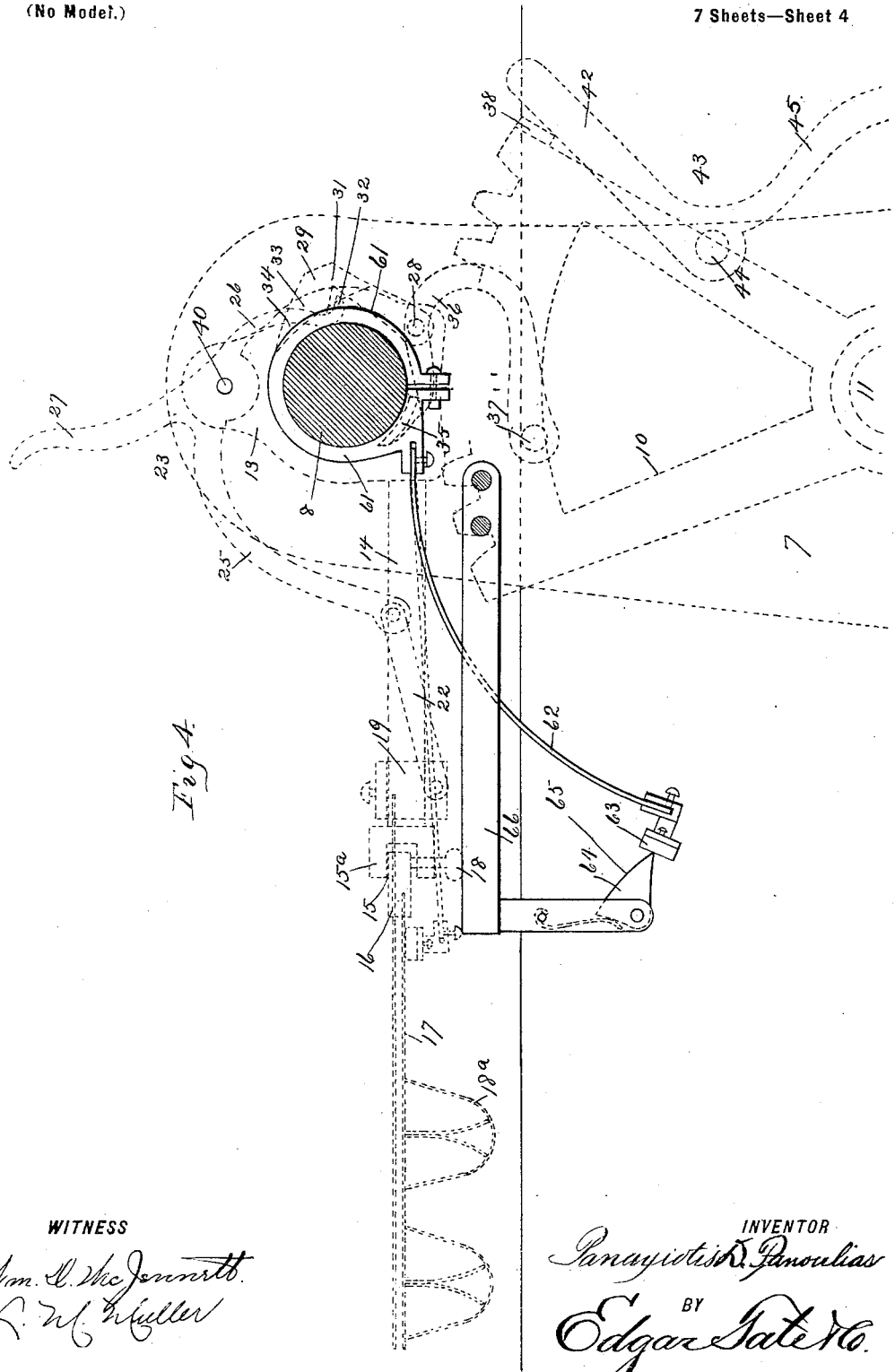
Figure 5:
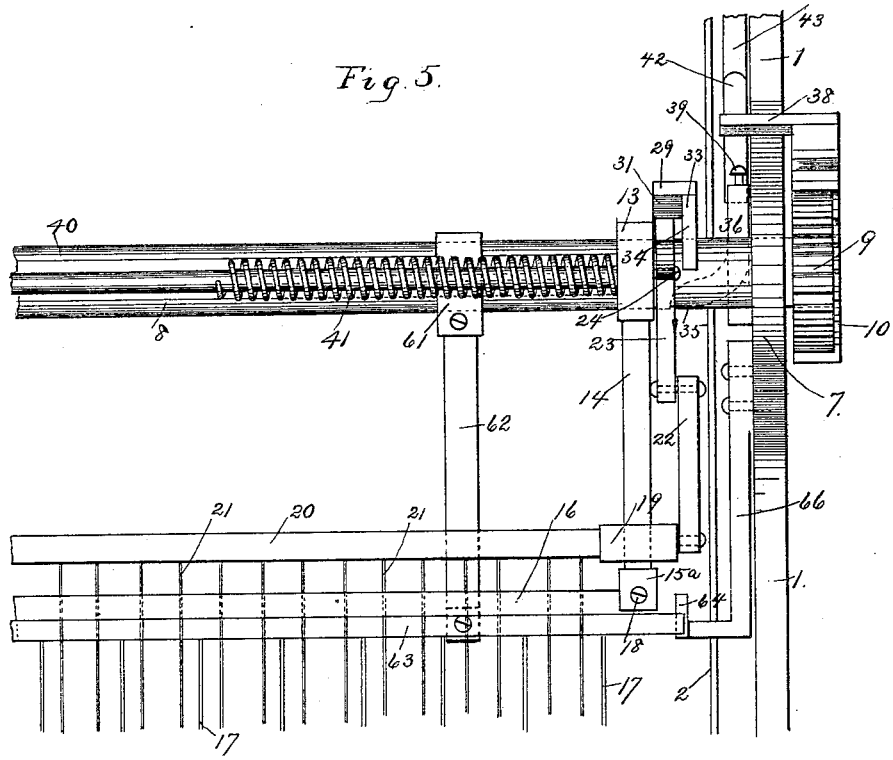
Figure 6:
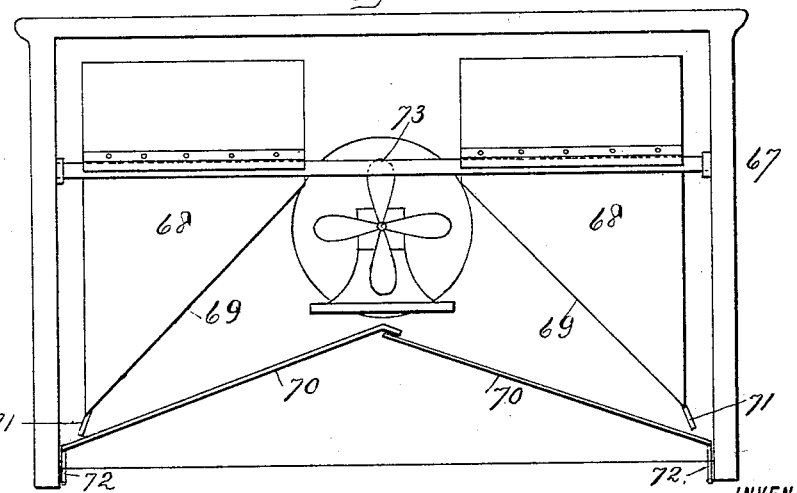
Figure 7:
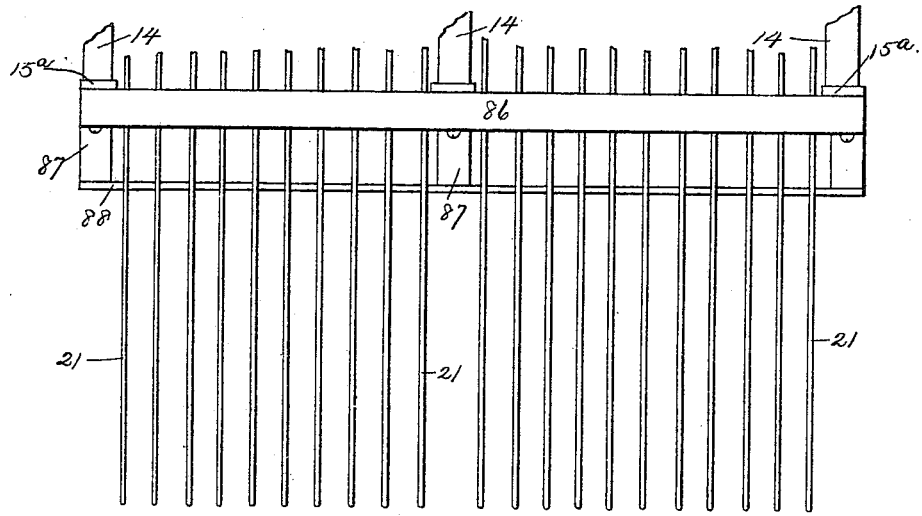
Figure 8:
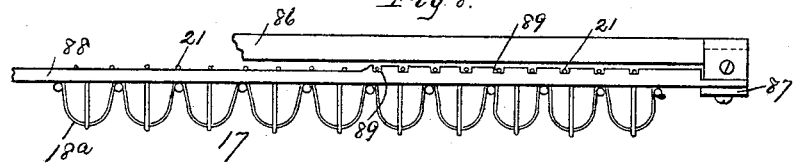
Figure 9:
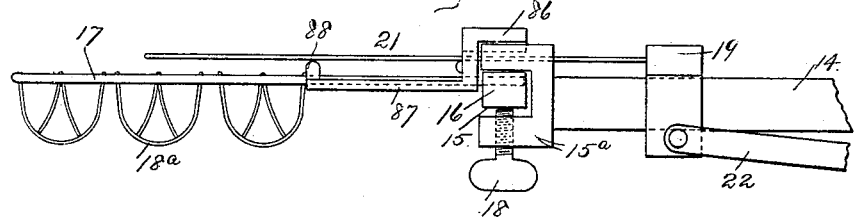

Figure 1 is a side view of the machine, one side of the casing being removed. Fig. 2 is a top or plan view of the machine, the top of the casing being removed. Fig. 3 is a detail side view, partly in section, illustrating the dipping mechanism. Fig. 4 is a detail side view, partly in section, illustrating the mechanism for knocking the surplus chocolate from the dipping-frame. Fig. 5 is a detail top view of the dipping mechanism. Fig. 6 is an end view of a portion of the machine, showing the cooling mechanism, the front of the casing being removed. Fig. 7 is a detail top or plan view of a part of the retaining-rod mechanism for holding the drops in the dipping-frame, illustrating a modified construction. Fig. 8 is a detail end view of the mechanism shown in Fig. 7. Fig. 9 is a detail side view of a modified form of the retaining-rod mechanism. Fig. 10 is a detail top view illustrating a modified construction of the dipping-frame. Fig. 11 is a detail end view of a portion of the frame illustrated in Fig. 10. Fig. 12 is a detail side view of a portion of the frame illustrated in Fig. 10. Fig. 13 is a detail end view of a portion of a modified form of dipping-frame. Fig. 14 is a detail top view of a portion of a frame constructed as shown in Fig. 13.

Referring to the drawings, 1 designates a framework, at the front end of which is carried a chocolate-reservoir 2, having an open top 3 and a bottom 4, curved segmentally with respect to the line of travel of the dipping-frame. The reservoir or receptacle 2 is preferably of hollow construction to provide a space between its segmental bottom 4 and the outer walls and main bottom, which space is adapted to be filled with hot water by means of an opening 5, which hot water operates to keep the chocolate in a liquid or plastic condition and may be drawn off by a faucet or cock 6 at the bottom.

At the sides of the chocolate-reservoir 2 the frame comprises uprights or brackets 7, in the upper portion of which are journaled the ends of a transverse shaft 8, extending across and over the chocolate-reservoir 2 and carrying at one of its outer ends a pinion 9, meshing with a segmental rack 10, which is fulcrumed or pivoted, as at 11, upon the bracket 7 and provided with a projecting handle or arm 12 at the top, by which it may be operated.

The shaft 8 operates as a rock-shaft and carries at its ends head-blocks or enlargements 13, from which project radial arms 14, having their outer ends headed and recessed, as at 15, for the reception of a cross-piece 16, which carries a dipping-frame 17, said frame being detachably secured by means of set-screws 18. This dipping-frame may be formed of a series of longitudinal and transverse wires carrying a series of concave pockets or receptacles $18^a$, which conform to the shape of the chocolate drop and are of skeleton wire construction, as shown. These receptacles $18^a$ are adapted to receive and carry the core or cream portion of the chocolate drop during the operation of dipping the same into the chocolate.

Upon the arms 14 are arranged longitudinally-sliding blocks 19, connected by a transverse cross-piece 20, carrying wire rods or fingers 21, which are arranged in a parallel series projecting radially with respect to the shaft 8 and preferably passing through the cross-piece 16 of the dipping-frame, as indicated in Fig. 3, which cross-piece thus forms a guide for said rods. The office of these rods 21 is to project outwardly and over the respective receptacles $18^a$, and to thus retain the chocolate drops in position during the operation of dipping, after which the rods are automatically returned to normal position back of or away from said receptacles by operation of the sliding blocks 19 and permit the chocolate drops to be deposited from the receptacles onto the apron or conveyer hereinafter described. The sliding blocks 19 are connected by means of a pivoted rod 22 with a lever 23, which is fulcrumed, as at 24, to the head-block 13 upon the shaft 8. This lever embodies an arm 25, projecting or curved outwardly from the fulcrum 24 to the inner end of the connecting-rod 22, a catch-arm or finger 26 projecting or curved outwardly from the fulcrum at the side opposite and in an opposite direction from the arm 25, and also an arm or finger 27, projecting from a point intermediately of and in an opposite direction from the arms 25 and 26. (See Fig. 3.) Upon the head-block 13, at the side of the shaft 8 opposite from the fulcrum 24 of the lever 23, is pivoted, as at 28, a catch 29, which is normally held in operative position by a spring 30 and comprises a beveled shoulder 31, forming a catch adapted to engage the point or end 32 of the arm 26 of the lever 23, and at the side of said shoulder 31 the catch is provided with an extension 33, having a beveled inner edge 34. The beveled edge 34 of the catch 29 is adapted to be engaged by a beveled point or end 35 upon a trip-arm 36 for the purpose of disengaging the catch from the arm 26 of the lever 23. The trip-arm 36 is fulcrumed, as at 37, to the standard or bracket 7 and is curved or bowed rearwardly, (see Fig. 3,) so that it is adapted to be engaged by a projection 38 at the rear edge of the segmental rack-piece 10, for which purpose the arm 36 preferably carries an adjustable projecting screw 39, adapted to contact with the projection 38. This engagement, which occurs at a certain point in the operation of the mechanism, operates to throw the pivoted arm 34 forwardly, so that it trips the catch 29 from engagement with the lever 23, and thus permits the sliding blocks 19 to return toward the shaft 8 (by spring actuation, as hereinafter described) and withdraw the rods 21 from their projecting position over the receptacles 18$^a$ for the purpose above stated. The operating-point 35 of the trip-arm 36 projects inwardly to the catch 29, as illustrated in dotted lines in Fig. 5.

The fulcrum 24 of the lever 23 is upon a transverse shaft 40, which carries a coiled spring 41, having one end secured to said shaft 40 and the other end to the head-block 13, (see Fig. 5,) which spring is adapted to operate to return the lever 23 as soon as it is released from the catch 29 to withdraw the rods 21. It will be understood that at the side of the machine opposite from that having the rack 10 and pinion 9 a similar head-block 13$^a$ is provided, which carries a lever 23$^a$, similar to the lever 23, connected by a rod corresponding to the rod 22 with the sliding block 19 at that side of the machine, and which head-block also forms a bearing for the end of the fulcrum-rod 40 upon which said lever 23$^a$ is secured; but at said opposite side of the machine no catch or trip or gear devices are needed.

In its rearward movement the segmental rack 10 is adapted to bear against an upwardly and rearwardly projecting arm 42 of a lever 43, fulcrumed, as at 44, to the upright or bracket 7 and having a downwardly-extending arm 45, which is connected to a pivoted link or rod 46, which connecting-rod extends rearwardly and has its rear end turned upwardly, as at 47, and pivotally connected, as at 48, to a plate or lever 49, which is fulcrumed, as at 50, and carries a pivoted pawl 51, adapted to engage a peripheral ratchet 52 upon a drum 53, said plate or lever 49 having its fulcrum at the axis of said drum and being governed in its operation by a coiled spring 54, extending from a point opposite its pivotal connection with the rod or arm 46 to the frame 1 of the machine, (see Fig. 1,) which spring serves to return the plate or lever 49 and the pawl to normal position after each stroke of the mechanism, the forward operation of the lever 43 by the function of said spring 54 being limited by a stop 55 upon the upright or bracket 7.

56 designates an endless apron which extends longitudinally over the top portion of the frame 1, as shown in Fig. 1, passing from the drum 53 upwardly over a transverse roller 57 at the front of the main portion of the frame of the machine, and from thence rearwardly and over a similar transverse roller 58 at the rear end of the machine, and from thence downwardly and forwardly to the drum, suitable transverse tightening-rollers, as at 59 and 60, being respectively arranged upon the frame of the machine at points in opposite relation with respect to the drum 53. The relative arrangement is such that the front end of said endless apron receives the dipped chocolate drops from the receptacles 18$^a$ of the frame 17 when the same are deposited thereon in the operation of the dipping mechanism, and the office of said roller is to convey during its successive movements the dipped chocolate drops to the rear end of the machine.

The shaft 8 carries near its ends collars 61, to which are connected spring-arms 62, which arms occupy a relative position with respect to the shaft at the side opposite from the fulcrum 24 of the lever 23 and project in an outward direction corresponding to the arm 25 of the lever 23 and the connecting-rod 22. These spring-arms carry at their free ends a transverse head-block 63, which extends between the arms and which is adapted to engage spring-actuated catches 64, having a beveled top end 65 and respectively carried upon arms 66, projecting forwardly from the uprights or brackets 7. (See Fig. 4.) In operation the segmental rack 10 will be first forced rearwardly in a part movement until it assumes the position indicated in dotted lines in Fig. 4, which will turn the shaft 8 so that the dipping-frame 17 is brought into horizontal projecting position in front of said shaft. At this point in the movement the rack 10 contacts with the lever 43 of the endless-belt-operating mechanism; but the tension of the spring 54 is such that a sufficient resistance to further movement of the rack 10 is exerted, whereby the dipping mechanism will remain in the position just stated and as illustrated in dotted lines in Fig. 4. The pockets or receptacles 18ª are then filled with the cream cores or bodies of the chocolate drops, and the lever 23, being now at the top of the shaft 8, is forced over by rearward movement of its arm 27 until the end of its arm 26 slips by and engages the catch-shoulder 31 upon the spring-actuated catch 29, which movement of the lever 23 will slide the blocks 19 forwardly upon the arms 14 and correspondingly carry the rods 21 out into position over the pockets or receptacles 18ª, thus locking the cores or bodies of the chocolate drops in position for the dipping operation. The segmental rack 10 is then forced rearwardly in a further movement against the arm 42 of the lever 43 and against the tension of the endless-belt-mechanism spring 54, which moves the arm 45 of the lever 43 forwardly, and thus causes the connecting-rod 46 to operate the plate or lever 49 and cause the pawl thereon to engage the ratchet 52 and turn the drum 53, thus moving the top portion of the endless belt rearwardly in one of its successive movements to carry the set of dipped chocolate drops (which have in the previous movement of the dipping mechanism been deposited upon said belt) rearwardly and leaving a new free surface at the front end of said belt for the deposit of the next set of dipped drops. This further rearward movement of the rack 10 causes a downward swing of the frame 21 into the chocolate-reservoir 2, whereby the drops are dipped into the body of the chocolate contained therein, and it will be understood that during this movement the arm 26 of the lever 23 remains in locked connection with the catch 29. During said further rearward movement of the segmental rack 10 and the downward movement of the frame 17, with the corresponding part revolution of the shaft 8, the cross-head 63 upon the spring-arms 62 has engaged the beveled edge 65 of the spring-actuated catches 64 and passed on downwardly beyond said catches. Now in the reverse movement of the rack 10 in a forward direction the pressure upon the arm 42 of the lever 43 is released, and the spring 54 operates to return the plate or lever 49 and its pawl into normal position with relation to the ratchet 52 upon the drum 53, ready for the next stroke, and at the same time during this forward return movement of the rack 10 the frame 17 is again brought upwardly to an approximately horizontal position over the chocolate reservoir or receptacle 2, during which upward movement the cross-head 63 upon the spring-arms 62 engages the point of the spring-actuated catches 64, and the springs are bowed into the position illustrated in Fig. 4 until their degree of curvature results in the cross-head 63 slipping up and past the point of the catches 64, (at which time the frame 17 will be in approximately horizontal position over the chocolate reservoir or receptacle 2,) when the return of said springs 62 to normal position will cause the cross-head 63 to fly upwardly against the wires of the frame 17 and jar the same, so that all surplus chocolate is effectually separated from the frame and drops into the reservoir 2. A further forward movement of the rack 10 turns the shaft 8 in a rearward direction, so that the frame 17 is carried upwardly and over into a projecting position at the rear side of said shaft and into a reverse position, with the pockets or receptacles 18ª upside down and over the free front top portion of the endless belt 56, as illustrated in Fig. 3. When this position of the frame 17 is reached, the forward movement of the rack 10 has caused its projection 38 to engage the screw 39 upon the trip-arm 36, whereby the latter has been forced forwardly, so that its points 35 engage the beveled edge 34 of the catch 29 and forces the same outwardly from engagement with the arm 26 of the lever 23, when by action of the spring 41, as above described, the retaining-rod mechanism and the rods 21 fly or are withdrawn from their position with relation to the pockets or receptacles 18ª, (which at that point in the movement and position of the mechanism is under said pockets,) and the dipped chocolate drops are automatically deposited from said pockets or receptacles onto the apron 56. A part rearward movement of the rack 10 will then bring the frame 17 over into the normal horizontal and forwardly-projecting position (shown in dotted lines in Fig. 1) ready to be filled again with the cream cores or bodies of the chocolate drops and ready for a repetition of the dipping operation, as just above described.

The point or end 35 of the trip-arm 36 preferably bears against the shaft 8, as shown in Fig. 3, when the rack projection 38 is not in contact with its screw 39, so that said trip-arm will not drop from its proper position with relation to the catch 29. By the provision of the adjustable screw 39 the point of operation of said trip-arm with respect to the deposit of the chocolate drops from the pockets or receptacles 18ª upon the apron 56 may be conveniently regulated for different-sized drops or to suit other circumstances or conditions, as desired.

A supplementary box or casing 67 is mounted upon the frame 1 above the apron 56 and carries interiorly at opposite sides ice-boxes 68, which preferably have downwardly and outwardly inclined bottoms 69, as shown in Fig. 6. Beneath said ice-boxes and extending in a longitudinal plane are deflector-plates 70, which are preferably inclined downwardly and outwardly and extend transversely across the interior of the box or casing 67, beneath the ice-boxes, and nearly from end to end of the casing. The ice-boxes may have drip-pipes 71, opening upon the inclined deflector-plates 70, and from the outer lower edges of the latter suitable drain-pipes 72 also extend. At the rear end of the casing 67, in a position between and with relation to the ice-boxes 68, is mounted a fan 73, which may be an ordinary electric fan or any other adapted device, said fan operating to force a current of air forwardly between and around the ice-boxes and downwardly around the front edge of the deflector-plates 70 and beneath the latter, so that said current of air passes rearwardly over the dipped chocolate drops which are being carried toward the rear end of the machine in the successive movements of the endless apron 56. At the rear end of the casing 67 is provided an opening 74, arranged with relation to the rear end of the apron 56, beneath which opening is provided an inclined guide 75, which will operate to guide the cooled and finished chocolate drops as they fall from the apron 56 into a suitable pan or receptacle 76, mounted upon a platform or bracket 77 at the rear end of the machine. A transverse scraper 78 is arranged with respect to the portion of the apron 56 which passes around the rear roller 58, so that said scraper removes any surplus chocolate from the apron during the passage of the same around said roller and permits the same to drop into a receptacle 79, which is mounted upon the bracket or platform 77. The scraper 78 and deflector or incline 75 are so arranged that the surplus chocolate removed by the scraper will drop through a slot 80 in the deflector or incline 75 and from thence into the receptacle 79. A transverse deflector 81 may be arranged to project downwardly and outwardly from the top of the opening 74.

A suitable heating mechanism may be arranged beneath the chocolate-reservoir 2, if desired. At the opening 82 at the front end of the box or casing 67, through which passes the apron 56, is preferably interiorly provided a downwardly and rearwardly curved deflector-plate 83, which will operate to deflect the air-current around and downwardly and under the deflector-plates 70. Said opening 82 may be adjusted or regulated with respect to different-sized chocolate drops by means of a transverse plate 84, adapted to slide vertically by means of an adjusting-screw 85 or other device, said slot 84 being arranged so that the chocolate drops will just clear the under edge of the same in their carriage rearwardly by the apron, it being desirable to have the opening 82 no larger during the operation of the machine than is required for the passage of the finished drops into and through the cooling and drying box or casing 67.

In Figs. 7, 8, and 9 I have shown a modified construction of the retaining-rod mechanism, which operates to cover the pockets or receptacles 18ª. In lieu of having the rods 21 pass through the cross-piece 16, which carries the frame 17, a cross-piece 86 is mounted upon the recessed heads 15ª at the outer ends of the arms 14 and carries forwardly-projecting arms or brackets 87, upon the front ends of which are carried a transverse rib or flange-piece 88. The relative construction and arrangement are such that the rods 21 project from the sliding blocks 19 beneath the under or inner edge of the cross-piece 86, while their outer portions rest upon the top or outer edge of the cross rib or flange 88. The rods are thus retained during their sliding movement between the respective edges of the members 86 and 88 and are effectively supported by means of the forward extension of the brackets or arms 87. The rods 21 may simply rest upon the edge of the rib 88, as shown at one side of Fig 8, or the edge of the rib 88 may be provided with guide-recesses 89 for the reception of said rods, as shown at the other side of said Fig. 8. This modified construction, as just described, provides a strong and well-braced mechanism for insuring the effective guidance and support of the retaining-rods 21.

In Figs. 10, 11, and 12 I have illustrated a modified construction of the dipping-frame, in which in lieu of having the pockets or receptacles 18ª formed of bent wire the main rods 90, which project outwardly from the cross-bar 16, carry a series of longitudinal and transverse plates or strips 91 and 92, respectively arranged in relatively parallel position, with a suitable intervening space, and respectively carrying laterally - projecting supplementary plates 93, the inner edges of which conjointly form the side walls of a pocket-space, within which the cream cores or bodies of the chocolate drops are set, said cores or bodies being supported by means of wire rings 94, which are carried upon a longitudinal rod 95, arranged beneath the plates or strips of the main portion of the frame. The rods 95 are carried at their inner ends in arms 96, which depend from the end bars 90 of the frame, said arms 96 being slotted, as at 97, so that when the frame is inverted after the dipping operation the rods 95 and their rings 94, which form the supporting-base for the chocolate drops, will drop by reason of the sliding movement of said rods 95 in the slots 97 and operate to eject the chocolate drops from between the supplementary laterally-projecting plates 93. The rods 95 may be supported at their central portion in hook-shaped arms 98, depending from the middle rod 90 of the frame. The base-rings 94 may be provided with an upwardly-projecting finger 99 at one side to form a lateral brace for the bottom portion of the chocolate drops, if desired. The pocket-space between the laterally-projecting plates 93 may be either of circular contour, as shown at one side of Fig. 10, or of oblong contour, as shown at the other side of said Fig. 10, and the base-rings 94 may be of corresponding circular or oblong contour, or said base rings or supports may be of any other desired shape or contour with respect to the size or form of chocolate drops which it is desired to manufacture.

I have also illustrated a further modification of the dipping-frame in Figs. 13 and 14, in which the laterally-projecting supplementary plates 93 are carried upon cross-wires 100 and 101, as shown, which embodies a very simple and inexpensive and effective construction. In this construction the rods 95, carrying the base rings or supports 94, may also be slidably connected with the arms 96, depending from the rods 90 of the frame.

Having fully described my invention, I claim as new, and desire to secure by Letters Patent—

1. A machine for dipping chocolate drops, comprising a chocolate receptacle or reservoir, a rock-shaft, a dipping-frame carried by and projecting from said shaft, a retaining mechanism slidably mounted upon the dipping-frame and operating to retain the drops therein during the dipping movement, devices carried by the rock-shaft and operating to actuate said retaining mechanism, means carried by the rock-shaft and operating to lock said operating devices during the dipping movement of the frame, and means for operating the rock-shaft to carry the frame in its dipping movement and turn the same to inverted position and for releasing said locking means when the frame reaches an inverted position, substantially as and for the purpose set forth.

2. A machine for dipping chocolate drops, comprising a chocolate receptacle or reservoir, a rock-shaft, a dipping-frame carried by and projecting from said shaft, mechanism slidably mounted upon the dipping-frame and operating to retain the drops therein during the dipping movement, devices carried by the rock-shaft and operating to actuate said retaining mechanism in its sliding movement, means carried by the rock-shaft and engaging said actuating devices during the dipping movement of the frame, trip mechanism arranged with relation to said locking means, and operating mechanism for actuating the rock-shaft and engaging said trip mechanism, substantially as and for the purpose set forth.

3. A machine for dipping chocolate drops, comprising a chocolate receptacle or reservoir, a frame adapted to carry the chocolate drops, means for operating said frame in a dipping movement, spring devices carried by said moving frame mechanism in its dipping movement, and mechanism for engaging and setting and subsequently releasing said spring devices as the frame returns in its dipping movement, whereby said spring devices operate to jar the frame, substantially as and for the purpose set forth.

4. A machine for dipping chocolate drops, comprising a chocolate receptacle or reservoir, a swinging frame adapted to carry the chocolate drops, means for operating said frame in its dipping movement, spring-arms carried by said operating-frame, and catch devices having a fixed position with relation to the swinging movement of the frame, said catch devices being adapted to engage the spring-arms during the swing of the frame, and set the same and release said arms after the dipping movement, whereby the automatic jarring of the frame is effected, substantially as and for the purpose set forth.

5. As an improvement in machines for dipping chocolate drops, a dipping-frame comprising pockets or receptacles adapted to receive and carry the chocolate drops and embodying a movable base portion or support, whereby when the frame is turned to inverted position the base portion of said pockets or receptacles will drop and facilitate the deposit of the drops, substantially as and for the purpose set forth.

6. As an improvement in machines for dipping chocolate drops, a dipping-frame comprising longitudinal transverse cross-pieces carrying supplementary laterally-projecting strips the inner edges of which form a pocket or receptacle for containing the drops, said dipping-frame embodying a movable base portion or support for said pockets or receptacles whereby when the frame is turned to inverted positions the base portion of said pockets or receptacles will drop and facilitate the deposit of the drops, substantially as and for the purpose set forth.

7. In a machine for dipping chocolate drops, a chocolate receptacle or reservoir, a rock-shaft, a dipping-frame carried by and projecting from said rock-shaft, said dipping-frame comprising pockets or receptacles adapted to receive and carry the chocolate drops and embodying a movable base portion or support whereby when the frame is turned to inverted position the base portion of said pockets or receptacles will drop and facilitate the deposit of the drops, a retaining mechanism slidably mounted upon the dipping-frame and operating to retain the drops therein during the dipping movement, devices carried by the rock-shaft and operating to actuate said retaining mechanism, means carried by the rock-shaft and operating to lock said actuating devices during the dipping movement of the frame, and means for operating the rock-shaft to carry the frame in its dipping movement and turn the same to inverted position to facilitate the release of the drops, and means for releasing said locking means when the frame reaches an inverted position, substantially as and for the purpose set forth.

8. As an improvement in machines for dipping drops, a dipping-frame comprising pockets or receptacles adapted to receive and carry the chocolate drops and embodying a movable base portion or support whereby when the frame is turned to inverted position the base portion of said pockets or receptacles will drop and facilitate the deposit of the drops, said movable base portion furnishing means for pressing and marking the drops, substantially as and for the purpose set forth.

In testimony that I claim the foregoing as my invention I have signed my name, in presence of the subscribing witnesses, this 30th day of March, 1898.

PANAYIOTIS D. PANOULIAS.

Witnesses:
L. M. MULLER,
M. A. KNOWLES.